United States Patent
Creber et al.

(10) Patent No.: US 6,495,272 B1
(45) Date of Patent: Dec. 17, 2002

(54) HIGH QUALITY OPTICAL SURFACE AND METHOD OF PRODUCING SAME

(75) Inventors: Brian W. Creber, Dunrobin; Kirk Guttin, Nepean, both of (CA)

(73) Assignee: B-Con Engineering Inc., Nepean (CA)

( * ) Notice: Subject to any disclaimer, the term of this patent is extended or adjusted under 35 U.S.C. 154(b) by 91 days.

(21) Appl. No.: 09/685,356

(22) Filed: Oct. 10, 2000

(30) Foreign Application Priority Data

Jul. 6, 2000 (CA) .............................................. 2313438

(51) Int. Cl.[7] .......................... B32B 15/00; B05D 5/00; G02B 1/00
(52) U.S. Cl. ...................... 428/652; 359/359; 359/360; 359/584; 359/585; 427/162; 427/314; 427/318; 427/355; 427/367; 427/404; 427/405; 427/406; 428/658; 428/672; 428/680; 428/687; 428/912.2; 428/926; 428/935; 428/936; 451/901
(58) Field of Search ................................ 428/652, 658, 428/672, 680, 687, 912.2, 935, 936, 926; 451/901; 427/162, 314, 318, 319, 327, 328, 355, 367, 404, 405, 406, 436; 359/359, 360, 584, 585

(56) References Cited

U.S. PATENT DOCUMENTS

| | | |
|---|---|---|
| 4,074,416 A | 2/1978 | Rambauske et al. |
| 4,082,908 A | 4/1978 | Vanaglash, Jr. |
| 4,374,002 A | 2/1983 | Arnold et al. |
| 4,407,860 A | 10/1983 | Fleming et al. |
| 4,411,965 A | 10/1983 | Rosegren et al. |
| 4,423,650 A | 1/1984 | Decker et al. |
| 4,475,794 A | 10/1984 | Baker et al. |
| 4,561,333 A | 12/1985 | Kohno et al. |
| 4,601,958 A | 7/1986 | Levine |
| 4,643,518 A | 2/1987 | Taniguchi |
| 4,666,796 A | 5/1987 | Levine |
| 4,713,824 A | 12/1987 | Heller |
| 4,772,111 A | 9/1988 | Shimura et al. |
| 4,837,052 A | 6/1989 | Lorimer |
| 4,915,494 A | 4/1990 | Shipley et al. |
| 5,051,317 A | 9/1991 | Solidum |
| 5,134,461 A | 7/1992 | Yamakawa et al. |
| 5,582,863 A | 12/1996 | Textor et al. |
| 5,679,469 A | 10/1997 | Shimoda et al. |
| 5,706,999 A | 1/1998 | Lim et al. |
| 5,730,853 A | 3/1998 | Smith et al. |
| 5,864,425 A | 1/1999 | Filas |
| 5,892,618 A | 4/1999 | Filas |

OTHER PUBLICATIONS

R. Taylor Hobson Inc. Precision Park, P.O. Box 543 Keene, New Hampshire 03431–0543 USA, "Interferometric Evaluation of Tool Center", Dec., 1992.

J.K. Myler et al., SPIE vol. 1333 Advanced Optical Manufacturing and Testing (1990), "High Quality Diamond Turning", pp. 58–62; (No month given).

*Primary Examiner*—Robert R. Koehler
(74) *Attorney, Agent, or Firm*—Pearne & Gordon LLP

(57) ABSTRACT

A method of producing high quality optical surfaces is disclosed. The invention allows for the production of optical surfaces with complex geometry while retaining the high quality of the optical surface. A top layer is provided on a substrate. In order to adhere the top layer to the substrate, an adhesion layer is applied first. In the preferred embodiment, the substrate is an aluminum substrate, the adhesion layer includes a layer of zinc and a layer of nickel and the top layer is gold. The substrate is generally stress free in order to provide a flat surface with no undulations. This allows a relatively thin layer of gold to be applied which then can be diamond turned in order to achieve a reflective layer.

24 Claims, 7 Drawing Sheets

HIGH QUALITY OPTICAL SURFACE AND METHOD OF PRODUCING SAME

FIELD OF INVENTION

The invention relates generally to optical surfaces used in the infrared and visible wavelength regions and more particularly to high quality optical surface and a method of producing high quality optical surfaces.

BACKGROUND

High quality optical surfaces are used in a number of industries including telecommunications, in the visible and infrared wavelength regions of the optical spectrum. The quality of an optical surface is measured by the flatness, the surface scatter and the reflectivity of the surface.

The achievable flatness of a surface is limited by the Computer Numerical Controlled (CNC) manufacturing process. The typical methods of manufacturing optical shapes in metals include conventional grinding, polishing and CNC manufacture using diamond tools. However, these conventional methods do not lend themselves to the manufacture of complex shapes. The surfaces are uneven and comprise a number of undulations.

The scatter of an optical surface is influenced by the diamond turning process. Conventional diamond turning methods do not produce uniform thickness along the surface. Typical materials used in standard optical shapes include aluminum, copper and nickel. Aluminum generally contains a number of impurities and these impurities are heavily concentrated at grain boundaries. Therefore, diamond turning an aluminum surface usually results in values of about 10 nanometers Root Mean Squared (RMS) for surface scatter. Copper generally yields better results— about 5 RMS, however copper has the drawback of being susceptible to corrosion.

A typical method of producing high quality surfaces with an aluminum substrate is to plate the surface with nickel and to diamond turn the nickel. Using this method, typical values achieved for surface scatter are about 5 nanometers RMS. However, a major problem for nickel plated substrates that are diamond turned exists. Since the diamond turning procedure results in a non uniform thickness of nickel and since nickel and aluminum have very different thermal expansion coefficients, the optical surface tends to deform as the temperature changes in the operating environment. This reduces the quality of the surface.

The achievable reflectivity at the operating wavelength is determined by the material properties of the optical surface. Typically gold is applied to the surface of a substrate to increase the reflectivity in the infrared. Gold is usually applied by vacuum depositing methods, which produces generally an uneven surface application. Also, vacuum deposited gold is generally soft gold. This gold layer has to be covered with a protective coating, which reduces the reflectivity of the surface.

Alternatively, it is also known to electroplate gold on to the surface. However, since the surface is generally uneven and comprises a number of undulations, the applied gold layer must be relatively thick to compensate for those undulations and provide a generally even surface. This results in high costs.

Often it is required that the optical surfaces be double sided; that is the optical surface comprise reflective surfaces on both sides of the substrate. Known methods do not lend themselves to producing good quality surfaces that are double sided because of the general unevenness of the substrate layer. When the top layers are diamond turned, they are diamond turned until each respective layer is even. However, the amount of diamond turning necessary to achieve this is generally different for each side. This is important because the differences in the final thicknesses of the layers on each side result in deformation due to temperature changes as described above. Due to the nature of the uneven substrate surface, this problem is inherent.

With the sophisticated uses of computer aided design, the optical surfaces required are becoming more and more complex. Also the tolerance for errors in these surfaces is decreasing. There exists a demand for high precision and high quality optical surfaces in a variety of geometrical shapes.

Therefore, there also exists a need for a method to produce these optical surfaces at an effective cost.

SUMMARY

The invention is directed to a method of producing high quality optical surfaces. The invention allows for the production of optical surfaces with complex geometry while retaining the high quality.

According to one aspect of the invention, there is provided a method of producing an optical surface comprising the steps of: providing a substrate, the substrate being stress free; applying an adhesion layer to the substrate, the adhesion layer including a first adhesion layer and a second adhesion layer; applying a top layer to the adhesion layer; and diamond turning the top layer to provide a reflective layer thereon.

According to another aspect of the invention, there is provided an optical surface comprising: a substrate the substrate being stress free; an adhesion layer on the substrate, the adhesion layer including a first adhesion layer and a second adhesion layer; top layer on the substrate; the top layer being diamond turned to provide a reflective layer thereon.

According to another aspect of the invention, there is provided an optical surface produced by a method comprising the steps of: providing a stress free substrate; applying an adhesion layer to the substrate; applying a top layer to the adhesion layer; and diamond turning the top layer to achieve a reflective layer.

According to another aspect of the invention, there is provided a double sided optical surface comprising: a stress free substrate, the substrate comprising a first and second surface; an adhesion layer on each of the first and second surfaces of the substrate, each adhesion layer including a first adhesion layer and a second adhesion layer; and a top layer on each of the adhesion layers, the top layers being diamond turned to achieve reflective layers on each of the first and second surfaces of the substrate.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION

Figure 1:
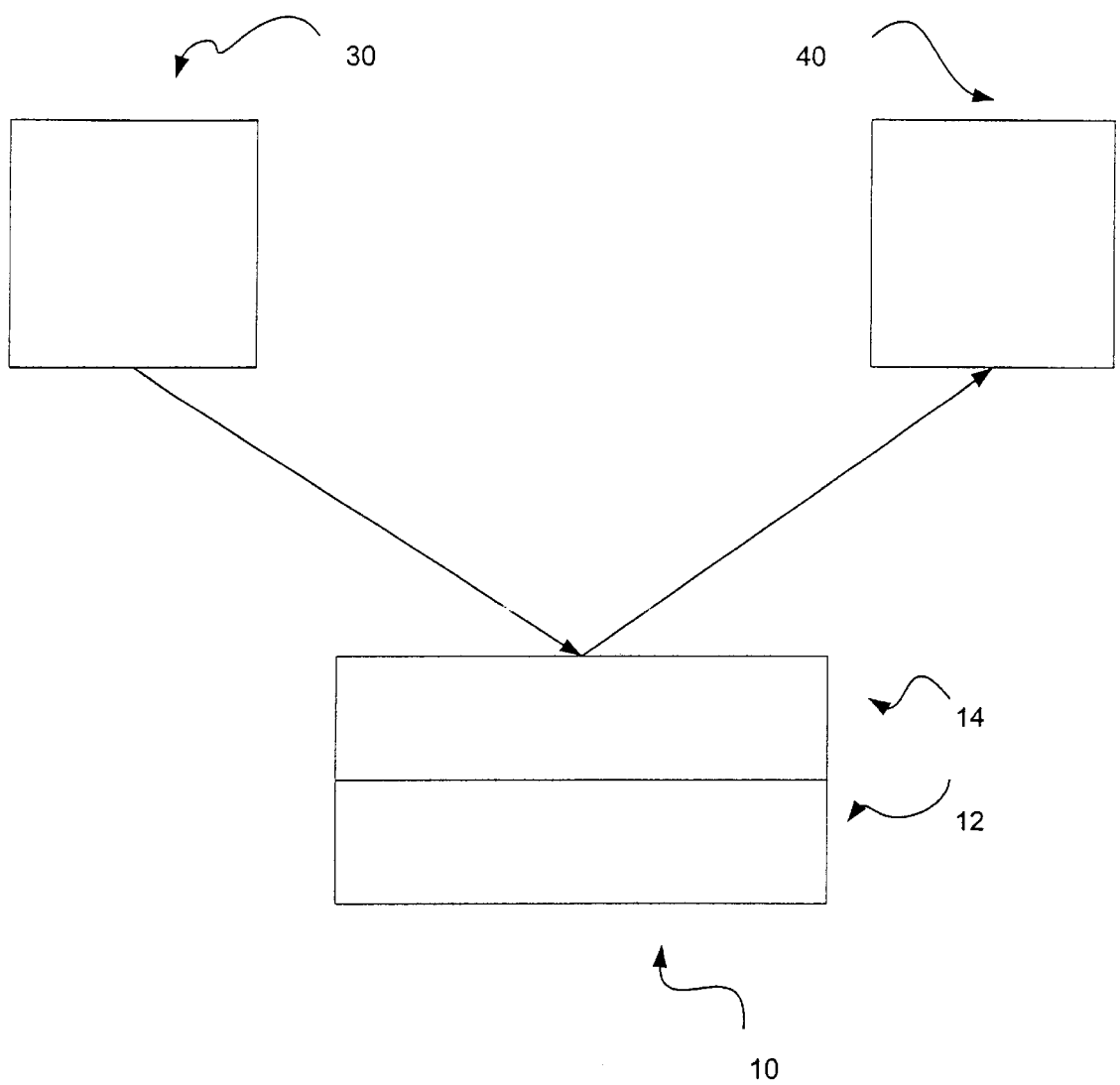
FIG. 1: illustrates a typical operating environment for an optical surface.

FIG. 1 illustrates a typical operating environment for an optical surface. Optical surface 10 includes substrate layer 12 and mirror layer 14. Beam of radiation is emitted from source of radiation 30, as shown in FIG. 1. Beam strikes optical surface 10 and is reflected to radiation detecting device 40. The source of radiation 30 may include a laser and the radiation detecting device 40 may include a photo-detector.

In order to achieve precise operation, optical surface 10 is manufactured to high precision and exhibits high reflectivity.

Figure 2:
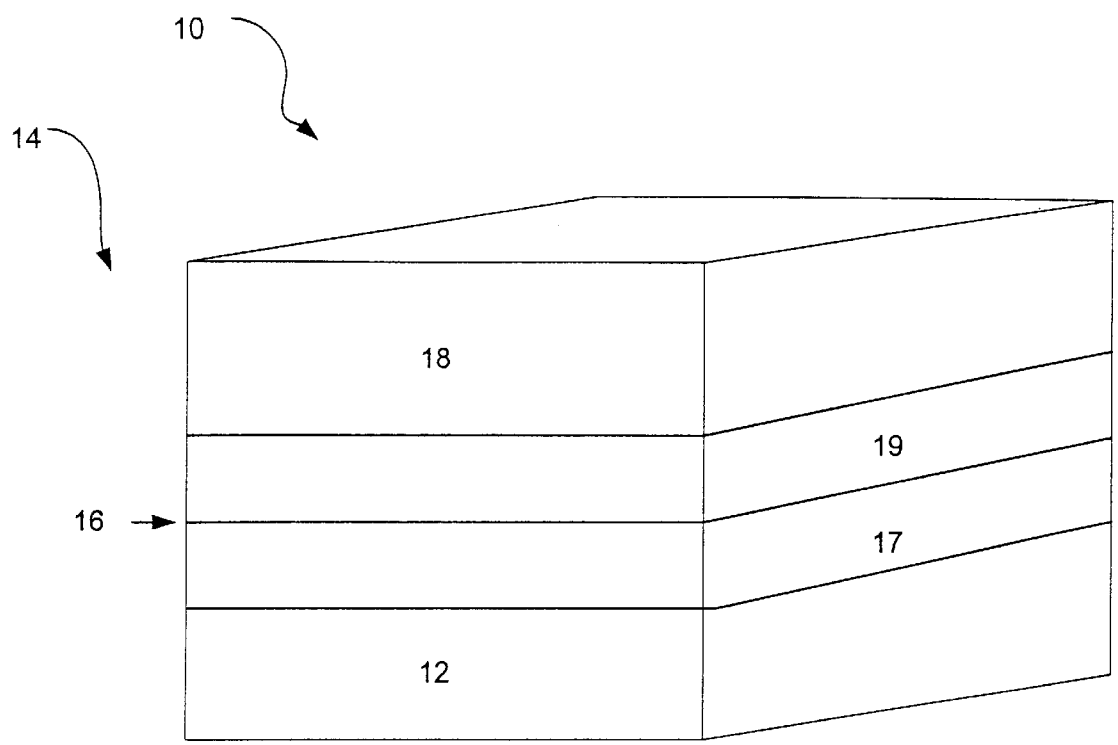
FIG. 2: illustrates a typical optical surface of the present invention.

The manufactured optical surface 10 of the present invention is seen in FIG. 2. The mirror layer 14 is further comprised of adhesion layer 16 and top layer 18, which is reflective. In a preferred embodiment, substrate 12 is an aluminum substrate, adhesion layer 16 includes layer of zinc 17 and layer of nickel 19 and top layer 18 is gold. However it will be understood that the layers can comprise of various materials as described below.

Figure 3:
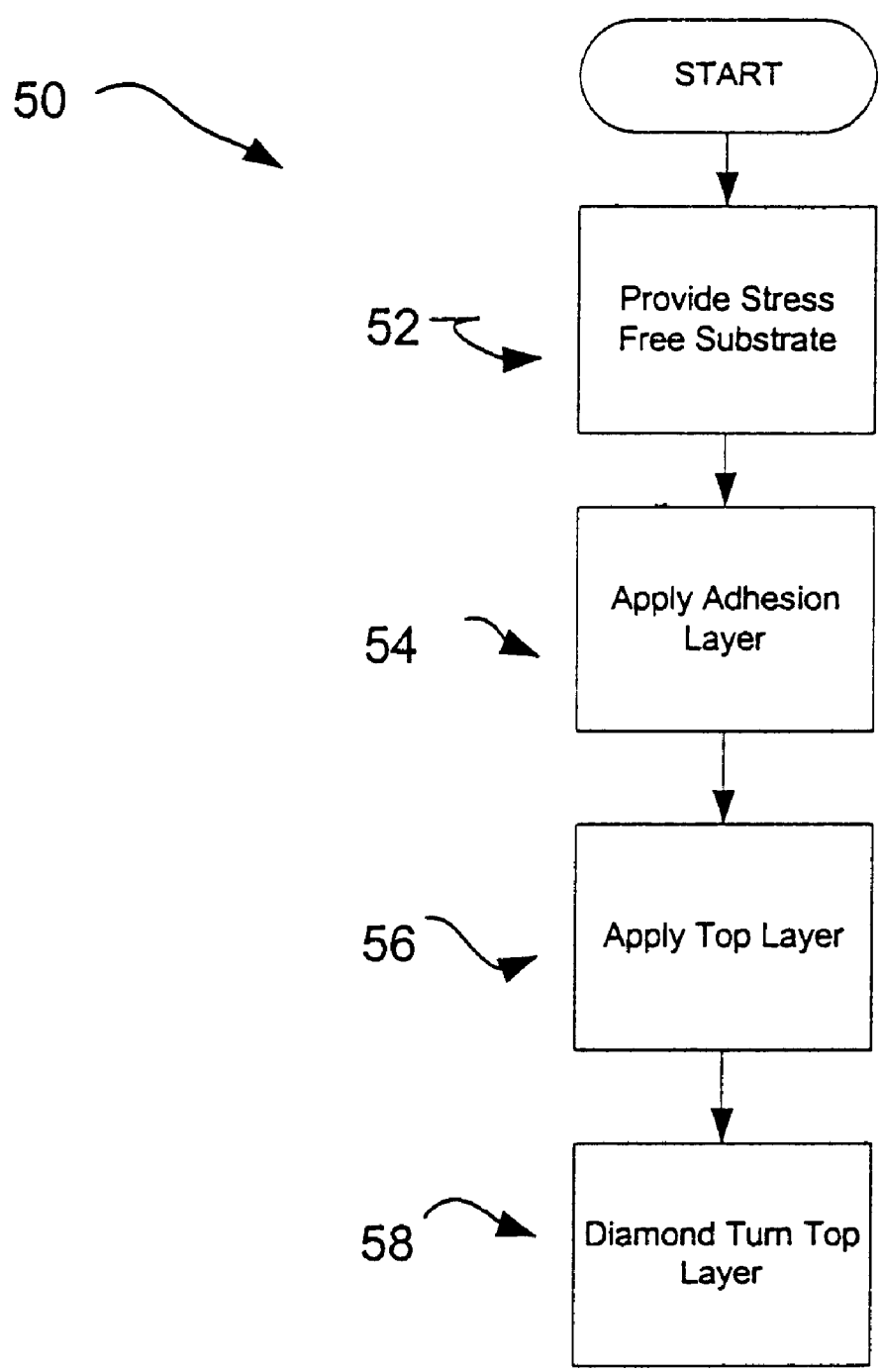
FIG. 3: illustrates the method of producing the optical surface of FIG. 2.

FIG. 3 illustrates method 50 of producing optical surface 10 of FIG. 2. In step 52, substrate 12 is provided. Substrate 12 ideally is an aluminum substrate. However, substrate 12 could be of any metal, including but not limited to copper or steel. The substrate surface may or may not be optical, however substrate 12 is manufactured to close to the desired shape of the final optical figure prior to providing a reflective layer to the substrate.

Figure 4:
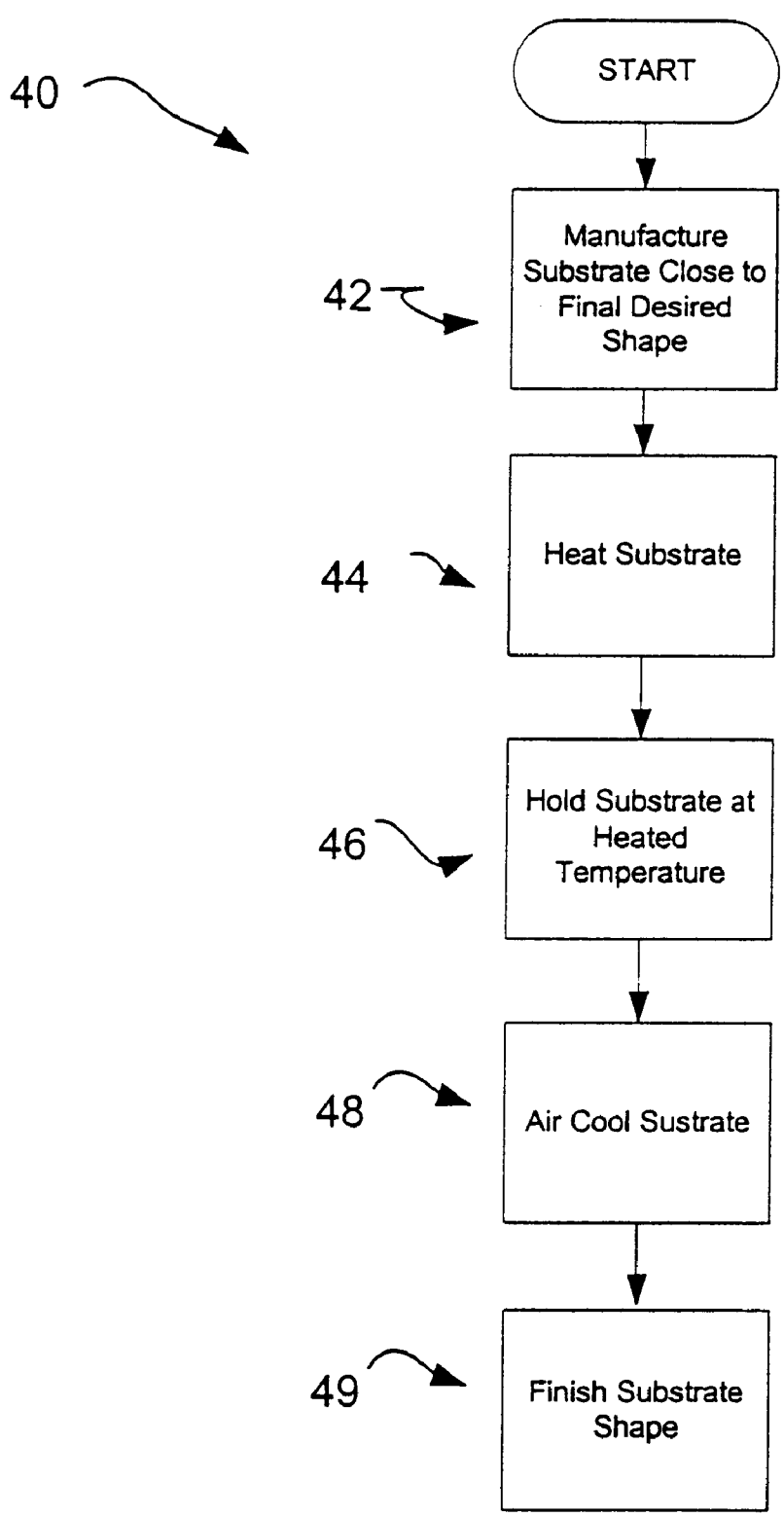
FIG. 4: illustrates the method of producing a stress free substrate according to the present invention.

There are many things to consider when the shape to be plated is being produced. It is important that substrate 12 be stress free, which can be achieved by conventional heat-treating techniques. The method of producing a stress free substrate is illustrated in FIG. 4 as method 40. In step 42, the substrate is manufactured close to the final desired shape of the optical surface. This can be done by any known technique, including CNC machining. The substrate should be manufactured using good quality, precise machinery. The term close is defined generally as being within 0.02 to 0.04 inches of the final shape. In step 44, the substrate is heated. The heating temperature is dependent upon the material of the substrate. For aluminum substrates, the heating temperature is about 375 degrees Fahrenheit. In step 46, the substrate is held at the heating temperature for a predefined length of time. In the case of an aluminum substrate, the length of time is about 8 hours. In step 48, the substrate is air cooled to room temperature. In step 49, the shape of the substrate is then finished using diamond tools in the top 0.02 to 0.04 inches. Due to the stress free state of the substrate, a very small of amount of material can be removed by the diamond turning, especially in precision and without any substantial deformation of the substrate. The use of diamond tools preserves the stress free state of the substrate.

Once the substrate is provided, then as step 54 of method 50, adhesion layer 16 is applied to substrate 12. This method is described in more detail below. In step 56, the gold layer is applied, the details of which are described below. In step 58, the optical surface is diamond turned.

In the preferred embodiment, adhesion layer 16 applied in step 54 is comprised of a layer of zinc 17 followed by a layer of nickel 19. However, adhesion layer 16 could comprise of other materials such as chrome or copper. The materials for the adhesion layer should be chosen based on the substrate material and the reflective material used. For example, if a nickel-chromium decorative plating was being used, the adhesion layer could include as a bindin layer, a layer of copper on a layer of zinc. The plating of metals depends on the physical properties and composition of the metal to be plated. For example, some may be poor conductors, while others may have a low strength-weight ration. There are a number of properties to consider in plating metals.

Figure 5:
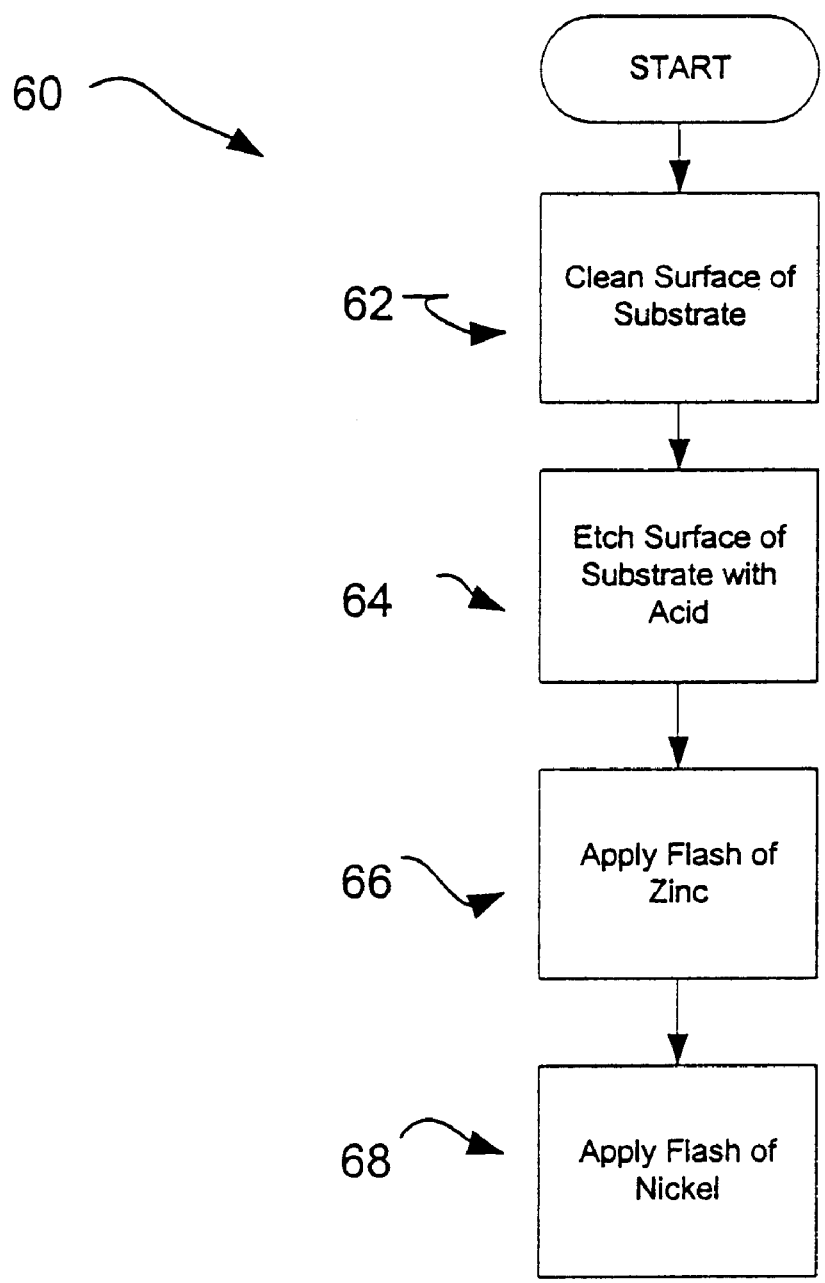
FIG. 5: illustrates the method of applying the adhesion layer to the substrate.

FIG. 5 illustrates method 60 of applying adhesion layer 16 to substrate 12. In step 62, the aluminum substrate surface is cleaned with a basic solution that will quicken adhesion with the plating metal. In step 64, the surface is etched with an acid solution to remove any film from the basic solution. In step 66, a flash of zinc is applied. As is common in the art, every step is preceded by rinsing the surface with deionized water.

Alternatively, the substrate could be immersed in a zincate solution. This will simultaneously clean the surface and apply a flash of zinc. The zinc layer serves to protect the aluminum substrate from oxidizing when exposed to air.

Figure 6:
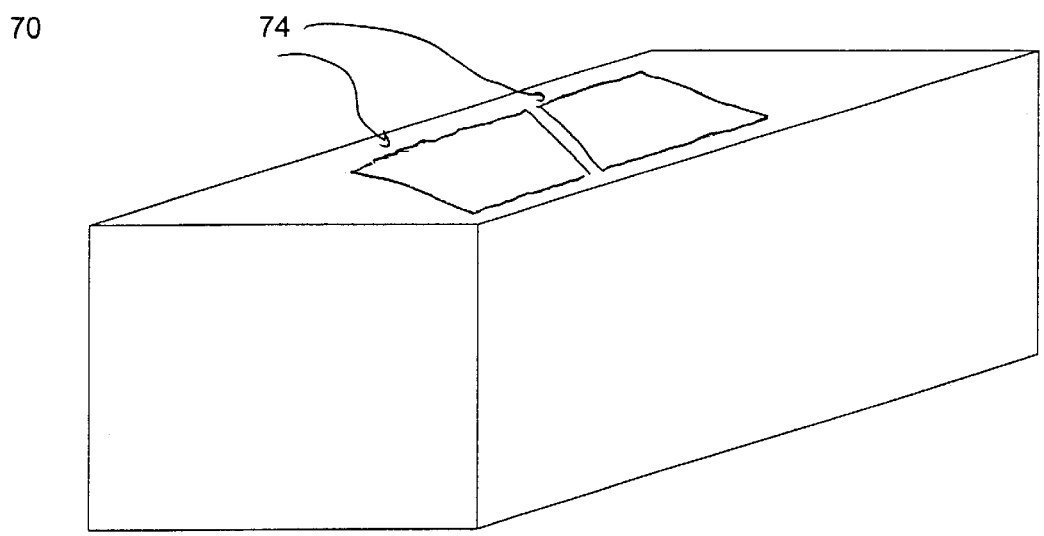
FIG. 6: illustrates a conventional electroplating system.
Figure 7:
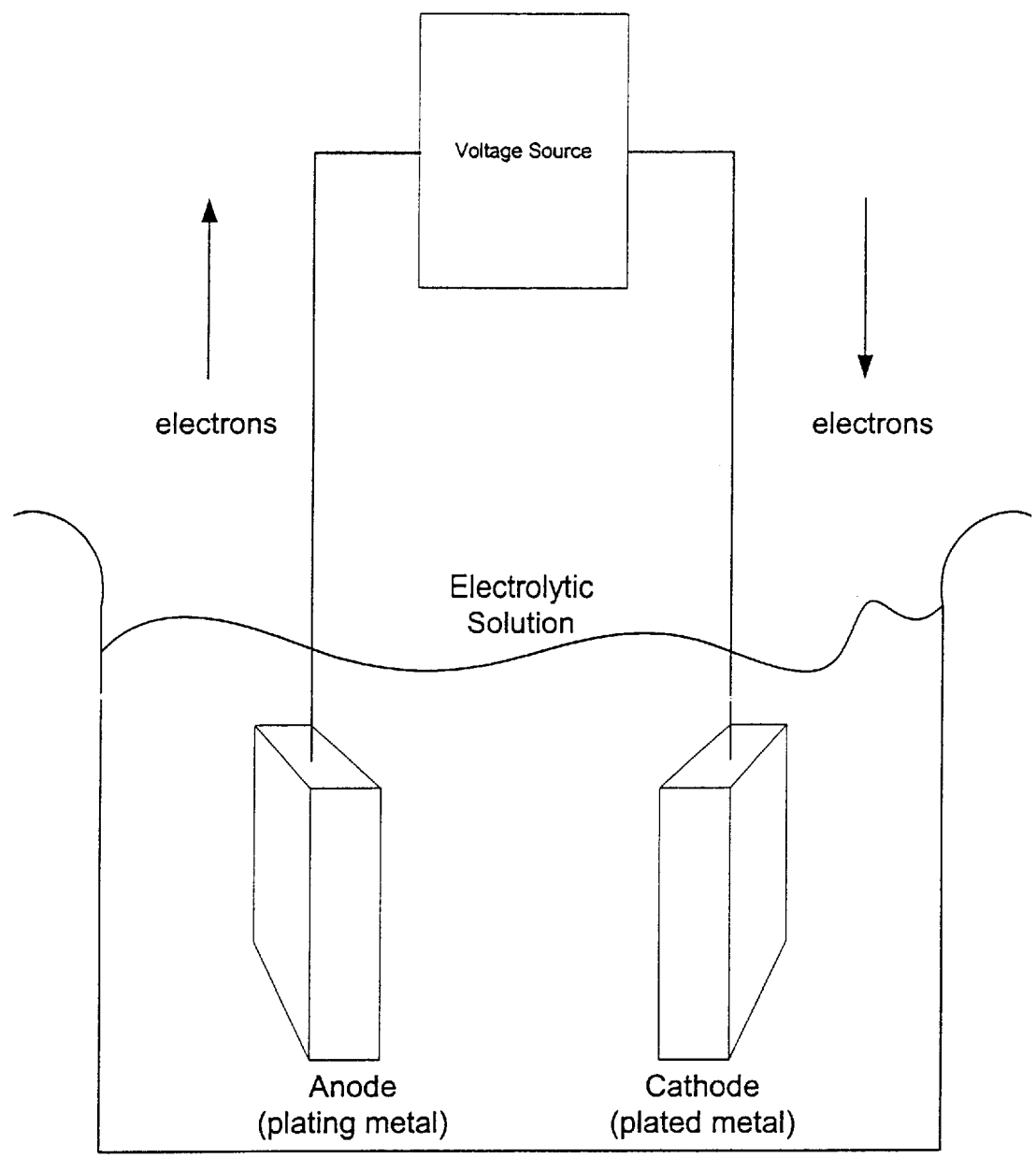
FIG. 7: illustrates a conventional electroplating apparatus.

A flash of nickel is then added overtop of the zinc in step 68. The zinc and nickel layers 17, 19 of steps 66, 68 are applied by any conventional means including electroplating, immersion into an electroless solution, metal spraying or vacuum metallizing. In a preferred embodiment of the invention, the layers are electroplated since the process is relatively simple in itself. In general, the steps of method 60 are performed on a conventional electroplating system such as the one illustrated in FIG. 6. Electroplating system 70 includes a base 72 in which a number of plating tanks 74 exist. Each plating tank is filled with the appropriate solution. Other systems could be used as well, such as a barrel plating system or a rack plating system. If electroplating techniques are used, the system may also include an electroplating apparatus 76 (FIG. 7) as is common in the art. The art of electroplating is common and will not be further explained in this document.

Regardless of the layering technique used, the procedure should provide for even and stable plating.

In the preferred embodiment of the invention, adhesion layer 16 is very thin, ranging only about a few micrometers thick (4–8 micrometers). A thin adhesion layer is more easily applied in an uniform thickness. A thin layer of nickel also produces a surface that is less susceptible to deformation of the optical surface due to differences in the thermal expansion coefficient between nickel and aluminum. Furthermore, the zinc layer serves as a binding layer between the nickel layer and the aluminum substrate, and the nickel layer as a binding layer for the top gold layer.

In step 56 of method 50, a top layer of gold 18 is applied to the adhesion layer. In a preferred embodiment, the gold layer applied is very thin, ranging only about 10 to 15 micrometers thick. The thin gold layer is achievable because the original substrate provided is stress free and flat. Since there are no undulations in the surface of the original substrate, a thin gold layer can be electroplated. In order to achieve a layer of uniform thickness, the gold layer is preferably electroplated on and could be applied using the electroplating system of FIG. 6 and electroplating apparatus of FIG. 7.

However alternate methods of applying the gold could include immersion into an electroless gold solution or vacuum depositing the gold.

The applied gold layer can generally be of any thickness. However, in order to diamond turn the layer, a thickness of at least 2 micrometers (50 microinches) is required.

In a preferred embodiment, the gold layer is a pure gold of 24 carat. However, gold alloys can also be used. If a gold alloy is used, it is preferably an alloy of nickel or cobalt with a gold content of at least 10 carat. It should be noted that a gold alloy of any kind can be used.

Applying a gold to the substrate according to the preferred embodiment achieves a number of benefits in addition to improving the IR reflectivity of the optical surface. Since gold and gold alloys are pure materials with little or no grain boundary impurities, the surface scatter is greatly reduced and reaches levels of about 1 to 2 nanometers RMS.

Also since gold has a lower tensile strength than aluminum and a thermal expansion coefficient that is closer to aluminum's than nickel, the final optical surface will not deform under changes in temperatures.

Another benefit gained from applying a gold layer according to a preferred embodiment where the original substrate layer is stress free such that a thin layer of gold can be achieved and this results in an end product that is less costly.

Also, by plating the gold layer, the requirement for a protective coating is eliminated. In general, plated gold is harder than vacuum deposited gold. However, if desired a protective coating could be applied and still remain within the scope of this invention.

Also if desired, the gold layer could be heat treated in order to harden the material.

According to the present invention, the final reflective layer requires no further machining since the optical surface produced is already of high quality. However, if desired the reflective layer could be further machined and still remain within the scope of this invention.

In the final step of method 50, the top layer 18 of gold is diamond turned in order to create a reflective layer. In a preferred embodiment, the layer is diamond turned in the top 5 to 8 micrometers. The diamond turned (reflective) surface can then be polished if desired.

The optical surface produced by the present invention generally has a reflectivity similar to the theoretical value of gold in the infrared and a surface scatter of about 1 to 2 nanometers RMS.

Figure 8:
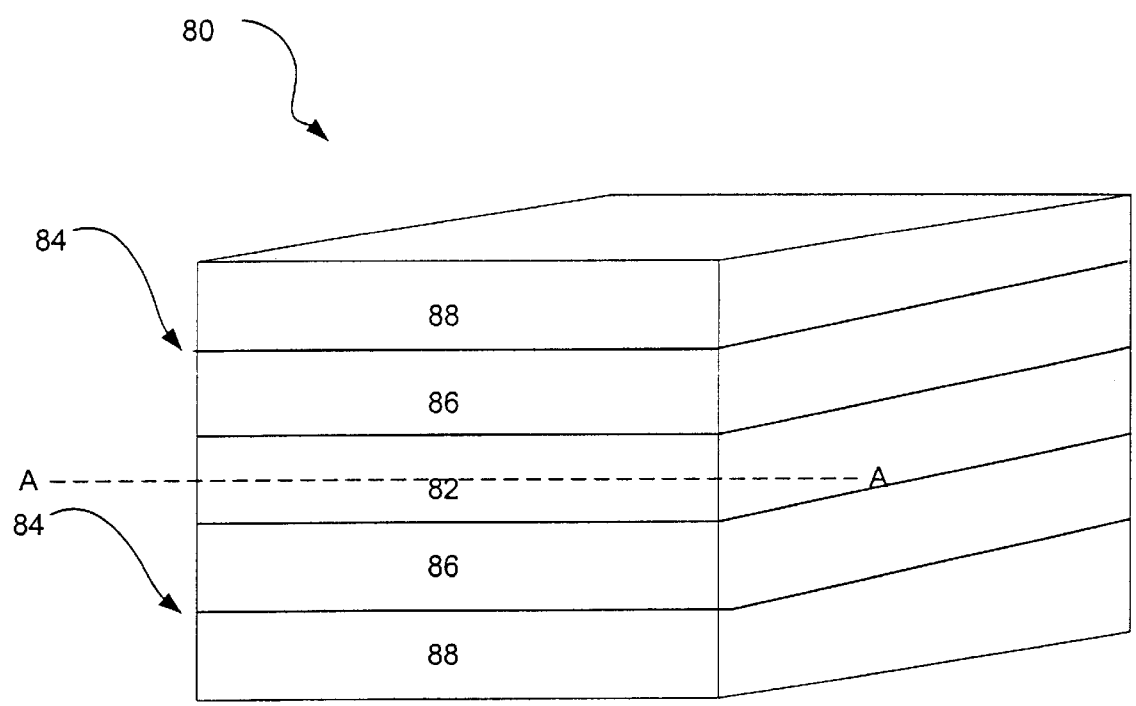
FIG. 8: illustrates a double sided optical figure.

The optical surfaces may also be double sided; that is the optical surface comprises reflective surfaces on both sides of the substrate. The manufactured optical surface 80 of this embodiment of the present invention is seen in FIG. 8. The mirror layer 84 is comprised of adhesion layer 86 and top layer 88, which is applied to two surfaces of the substrate 82. Layer 84 is symmetrical about axis AA which extends through the centre of substrate 82.

The method of producing the double sided optical surface comprising two reflective layers is similar to that described above with the steps being performed on both surfaces of the substrate. It is important to note that the optical surface be symmetrical about the center of the substrate to ensure that deformation due to temperature changes does not occur as described above, while the relative thicknesses of the layers is flexible.

Since the substrate surface provided is stress free and flat, the subsequent layers applied are also flat. Therefore, when the top layers are diamond turned to provide reflective layers, they are both diamond turned in the same distance, resulting in equal thicknesses on each side.

An advantage of the present invention is that high precision optical surfaces for use in the visible and infrared wavelength regions of the optical spectrum are produced.

It is also an advantage that optical surfaces that are less susceptible to deformation under changes in operating temperature are produced.

It is also an advantage that optical surfaces with a reflectivity close to that of the theoretical reflectivity of gold in the infrared are produced.

It is also an advantage that the invention provides a cost effective means of producing a high quality optical surface.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A method of producing an optical surface, the method comprising the steps of:
    (a) providing a substrate, the substrate being stress free;
    (b) applying an adhesion layer to the substrate; the adhesion layer including a first adhesion layer and a second adhesion layer;
    (c) applying a top layer to the adhesion layer; and
    (d) diamond turning the top layer to provide a reflective layer thereon.

2. The method as claimed in claim 1, wherein the adhesion layer is sufficiently thin so as to deter deformation of the optical surface.

3. The method as claimed in claim 2, wherein the first adhesion layer serves as a binding layer for the second adhesion layer and as a protective layer to prevent oxidation of the aluminium substrate, and the first adhesion layer includes a layer of zinc.

4. The method as claimed in claim 3, wherein the second adhesion layer serves as a binding layer for the top layer, and the second adhesion layer includes a layer of nickel.

5. The method as claimed in claim 4, wherein the substrate is manufactured to the shape of the final desired optical surface shape.

6. The method as claimed in claim 4, wherein the substrate comprises aluminum.

7. The method as claimed in claim 6, wherein the adhesion layer comprises nickel.

8. The method as claimed in claim 7, wherein the top layer is applied by electroplating.

9. The method as claimed in claim 8, wherein the adhesion layer is applied by electroplating.

10. The method as claimed in claim 4, wherein the top layer applied is about 10 to 15 micrometers thick.

11. The method as claimed in claim 7, wherein the adhesion layer further comprises zinc.

12. The method as claimed in claim 10, wherein the top layer is diamond turned in for about 5 to 8 micrometers.

13. An optical surface comprising:

(a) a substrate, the substrate being stress free;

(b) an adhesion layer on the substrate, the adhesion layer having a first adhesion layer and a second adhesion layer; and (c) a top layer on the adhesion layer, the top layer being diamond turned to provide a reflective layer thereon.

14. The optical surface as claimed in claim 13, wherein the substrate includes aluminium.

15. The optical surface as claimed in claim 14, wherein the first adhesion layer serves as a binding layer for the second adhesion layer and as a protective layer to prevent oxidation of the aluminium substrate, and the first adhesion layer includes a layer of zinc.

16. The optical surface as claimed in claimed in claim 15, wherein the second adhesion layer serves as a binding layer for the top layer, and the second adhesion layer includes a layer of nickel.

17. The optical surface as claimed in claim 16, wherein the top layer includes a gold layer or a gold alloy layer.

18. The optical surface as claimed in claim 17, wherein the gold alloy layer includes a gold-nickel alloy layer or a gold-cobalt layer.

19. The optical surface as claimed in claim 15, wherein the second adhesion layer includes a copper layer.

20. The optical surface as claimed in claim 19, wherein the top layer includes a nickel-chrome alloy layer.

21. The optical surface as claimed in claim 13, wherein the adhesion layer is about 4 to 8 micrometer thick.

22. The optical surface as claimed in claim 13, wherein the top layer is about 10 to 15 micrometer thick.

23. The optical surface as claimed in claim 22, wherein the top layer is diamond turned up to about 5 to 8 micrometers.

24. A double sided optical surface comprising:

(a) a stress free substrate, the substrate comprising a first and second surface;

(b) an adhesion layer on each of the first and second surfaces of the substrate; each adhesion layer including a first adhesion layer and a second adhesion layer; and (c) a top layer on each of the adhesion layers, the top layers being diamond turned to provide a reflective layer thereon.

* * * * *

UNITED STATES PATENT AND TRADEMARK OFFICE
CERTIFICATE OF CORRECTION

PATENT NO. : 6,495,272 B1
DATED : December 17, 2002
INVENTOR(S) : Brian W. Creber It is certified that error appears in the above-identified patent and that said Letters Patent is hereby corrected as shown below:

<u>Column 2,</u>
Line 38, please delete "layer; top", and insert therefor -- layer; and a top --.

<u>Column 6,</u>
Line 33, please delete ";"(semicolon), and insert therefor -- , -- (comma).
Line 34, please delete "layer to the", and insert therefor -- layer on the --.
Line 39, please delete "adhesion layer is sufficiently thin so as to deter deformation of the optical surface", and insert therefor -- substrate includes aluminum --.
Line 50, please delete "substrate is manufactured to the shape of the final desired optical surface shape", and insert therefor -- top layer includes a gold layer or a gold alloy layer --.
Line 53, please delete "claim 4, wherein the substrate comprises aluminum", and insert therefor -- claim 5, wherein the gold alloy layer includes a gold-nickel alloy layer or a gold-cobalt layer --.
Line 55, please delete "claim 6, wherein the adhesion layer comprises nickel", and insert therefor -- claim 3, wherein the second adhesion layer includes a copper layer --.
Line 58, please delete "is applied by electroplating", and insert therefor -- includes a nickel-chrome alloy layer --.
Line 59, please delete "claim 8, wherein the adhesion layer is applied by electroplating", and insert therefor -- claim 1, wherein the adhesion layer is about 4 to 8 micrometer thick --.
Line 61, please delete "claim 4, wherein the top layer applied", and insert therefor -- claim 1, wherein the top layer --.
Line 63, please delete "claim 7, wherein the adhesion layer further comprises zinc", and insert therefor -- claim 10, wherein the top layer is diamond turned up to about 5 to 8 micrometers --.

UNITED STATES PATENT AND TRADEMARK OFFICE
CERTIFICATE OF CORRECTION

PATENT NO.    : 6,495,272 B1
DATED         : December 17, 2002
INVENTOR(S)   : Brian W. Creber It is certified that error appears in the above-identified patent and that said Letters Patent is hereby corrected as shown below:

Column 6 cont'd,
Line 65, please delete "claim 10, wherein the top layer is diamond turned in for about 5 to 8 micrometers", and insert therefor -- claim 1, further comprising a step of polishing the optical surface after diamond turning --.

Signed and Sealed this

Twenty-fourth Day of June, 2003

JAMES E. ROGAN
*Director of the United States Patent and Trademark Office*